(12) United States Patent
Lee et al.

(10) Patent No.: US 9,147,878 B2
(45) Date of Patent: Sep. 29, 2015

(54) SECONDARY BATTERY COMPRISING AT LEAST A FIRST AND SECOND ELECTRODE EACH COATED WITH AN ACTIVE MATERIAL LAYER

(75) Inventors: Chanho Lee, Yongin-si (KR); Kiwoon Kim, Yongin-si (KR); Youngju Ahn, Yongin-si (KR); Jinho Lee, Yongin-si (KR); Junpyo Park, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 552 days.

(21) Appl. No.: 13/563,374

(22) Filed: Jul. 31, 2012

(65) Prior Publication Data

US 2013/0202931 A1 Aug. 8, 2013

(30) Foreign Application Priority Data

Feb. 7, 2012 (KR) ........................ 10-2012-0012309

(51) Int. Cl.
*H01M 4/485* (2010.01)
*H01M 4/525* (2010.01)
*H01M 2/22* (2006.01)
*H01M 2/26* (2006.01)
*H01M 2/30* (2006.01)
*H01M 2/34* (2006.01)
*H01M 4/58* (2010.01)
*H01M 10/052* (2010.01)
*H01M 10/058* (2010.01)

(52) U.S. Cl.
CPC ................ *H01M 4/485* (2013.01); *H01M 2/22* (2013.01); *H01M 2/26* (2013.01); *H01M 2/30* (2013.01); *H01M 2/348* (2013.01); *H01M 4/525* (2013.01); *H01M 4/5825* (2013.01); *H01M 10/052* (2013.01); *H01M 10/058* (2013.01); *Y02E 60/122* (2013.01)

(58) Field of Classification Search
CPC ........................ H01M 10/0431; H01M 2/263
USPC ............................................. 429/94
See application file for complete search history.

(56) References Cited

U.S. PATENT DOCUMENTS

2011/0076547 A1   3/2011  Shin
2011/0171516 A1*  7/2011  Byun et al. ................... 429/161
2013/0249498 A1*  9/2013  Yamamoto et al. ........... 320/137

FOREIGN PATENT DOCUMENTS

KR   10-1998-080397 A   11/1998
KR   10-2011-0035566 A   4/2011
KR   10-2011-0083463 A   7/2011

* cited by examiner

*Primary Examiner* — Patrick Ryan
*Assistant Examiner* — Lucas J O'Donnell
(74) *Attorney, Agent, or Firm* — Knobbe Martens Olson & Bear, LLP

(57) ABSTRACT

An electrode assembly and a secondary battery comprising the same are provided. The secondary battery includes at least one electrode assembly formed by winding together a first electrode plate and a second electrode plate each coated with an active material layer, a current collector, and a case accommodating the electrode assemblies and the current collector.

16 Claims, 7 Drawing Sheets

SECONDARY BATTERY COMPRISING AT LEAST A FIRST AND SECOND ELECTRODE EACH COATED WITH AN ACTIVE MATERIAL LAYER

CROSS-REFERENCE TO RELATED APPLICATION

This application claims priority to and the benefit of Korean Patent Application No. 10-2012-0012309 filed on Feb. 7, 2012 in the Korean Intellectual Property Office, the disclosure of which is incorporated in its entirety herein by reference.

BACKGROUND

1. Field

This disclosure relates to an electrode assembly and a secondary battery comprising the same.

2. Description of the Related Technology

Unlike primary batteries which cannot be recharged, secondary batteries can be repeatedly charged and discharged. Low capacity batteries that use single battery cells may be used as power sources for various small portable electronic devices such as cellular phones, and camcorders. High power batteries that use tens of battery cells connected to each other in a battery pack may be used as power sources for electric scooters, and hybrid electric vehicles (HEV).

Secondary batteries may be manufactured in various shapes, including a cylinder shape, and a prismatic shape. The secondary battery may be fabricated by forming an electrode assembly having a separator as an insulator disposed between a positive electrode plate and a negative electrode, accommodating the fabricated electrode assembly and an electrolyte in a case, and installing a cap assembly having electrode terminals in the case.

A secondary battery employed to propel an automotive vehicle requires a high capacity and is gradually getting bulky, unlike the conventional low-capacity secondary battery used with a small-sized electronic device. A prismatic battery may have a difference in the heat dissipation between the inside and the outside of a cell due to an increase in the thickness, making it difficult to attain improved safety. In particular, in a high power secondary battery having a plurality of battery cells in a jelly roll configuration for use in HEV, there may be a considerable temperature difference between a central cell and a peripheral cell. In addition, when penetration or internal short circuit occurs to a prismatic battery, a temperature of the centrally positioned cell may be increased. Thus, there is high probability of thermal runaway, potentially resulting in fire or explosion.

SUMMARY

Aspects of this disclosure provide an electrode assembly having improved safety by reducing a risk of fire or explosion even when penetration or internal short circuit occurs, and a secondary battery including the electrode assembly.

Aspects of this disclosure further provide a secondary battery including at least three or more electrode assemblies formed by winding together a first electrode plate and a second electrode plate each coated with an active material layer, a current collector, and a case accommodating the electrode assemblies and the current collector, wherein the electrode assemblies includes at least one or more first sub electrode assemblies, and a plurality of second sub electrode assemblies, wherein the first sub electrode assemblies disposed between the second sub electrode assemblies, and include an active material that generates less heat than that of the second sub electrode assemblies during operation of the battery. In certain embodiments, the secondary battery further comprises a separator disposed between the first and second electrode plates. In certain embodiments, the current collector may be electrically connected to the electrode assemblies. In certain embodiments, the active material generates 50% or less heat than that of the second sub electrode assemblies during operation of the secondary battery.

In certain embodiments, the first sub electrode assemblies may be wound with a smaller number of turns than the second sub electrode assemblies.

In certain embodiments, the active material layers of the first sub electrode assemblies may include $Li_xFePO_4$ ($0 \leq x \leq 1$). In certain embodiments, the active material layers of the first sub electrode assemblies may include $Li_xFePO_4$ wherein x is 1.

In certain embodiments, the active material layers of the second sub electrode assemblies may include $Li_xCoO_2$ ($0 \leq x \leq 1$). In certain embodiments, the active material layers of the first sub electrode assemblies may include $Li_xCoO_2$ wherein x is 1.

In certain embodiments, the secondary battery may further include an electrode terminal electrically connected to the current collector, wherein the current collector includes a connection part electrically connected to the electrode terminal, and an extension part extending from the connection part to at least three branch parts and coupled to each of the first sub electrode assemblies and the second sub electrode assemblies.

In certain embodiments, a thickness of a portion of the extension part coupled to the first sub electrode assemblies may be smaller than a thickness of a portion of the extension part coupled to the second sub electrode assemblies.

In certain embodiments, the thickness of the extension part coupled to the first sub electrode assemblies may be 1 mm and the thickness of the extension part coupled to the second sub electrode assemblies may be 1.5 mm.

According to aspects of the present embodiments, there is provided an electrode assembly of a secondary battery formed by winding together a first electrode plate and a second electrode plate, each coated with an active material layer and a separator, the electrode assembly including at least one or more first sub electrode assemblies, and a plurality of second sub electrode assemblies, wherein the first sub electrode assemblies disposed between the second sub electrode assemblies, and include an active material that generates less heat than that of the second sub electrode assemblies during operation of the battery. In certain embodiments, the electrode assembly further comprises a separator disposed between the first and second electrode plates. In certain embodiments, the electrode assembly generates 50% or less heat than that of the second sub electrode assemblies during operation of the secondary battery.

In certain embodiments, the first sub electrode assemblies may be wound with a smaller number of turns than the second sub electrode assemblies.

In certain embodiments, the active material layers of the first sub electrode assemblies may include $Li_xFePO_4$ ($0 \leq x \leq 1$). In certain embodiments, the active material layers of the first sub electrode assemblies may include $Li_xFePO_4$ wherein x is 1.

In certain embodiments, the active material layers of the second sub electrode assemblies may include $Li_xCoO_2$ ($0 \leq x \leq 1$). In certain embodiments, the active material layers of the first sub electrode assemblies may include $Li_xCoO_2$ wherein x is 1.

According to the present embodiments, even when penetration or internal short circuit occurs, there are provided an electrode assembly having improved safety by reducing a risk of fire or explosion and a secondary battery including the electrode assembly.

Additional aspects and/or advantages of the present embodiments will be set forth in part in the description which follows and in part will be obvious from the description or may be learned by practice of the present embodiments.

BRIEF DESCRIPTION OF THE DRAWINGS

The aspects, features and advantages of the present embodiments will be more apparent from the following detailed description in conjunction with the accompanying drawings, in which.

DETAILED DESCRIPTION

Hereinafter, examples of aspects of the present embodiments will be described in detail with reference to the accompanying drawings such that they can easily be made and used by those skilled in the art.

Exemplary embodiments will hereinafter be described in detail. However, these embodiments are exemplary, and this disclosure is not limited thereto.

Figure 1:
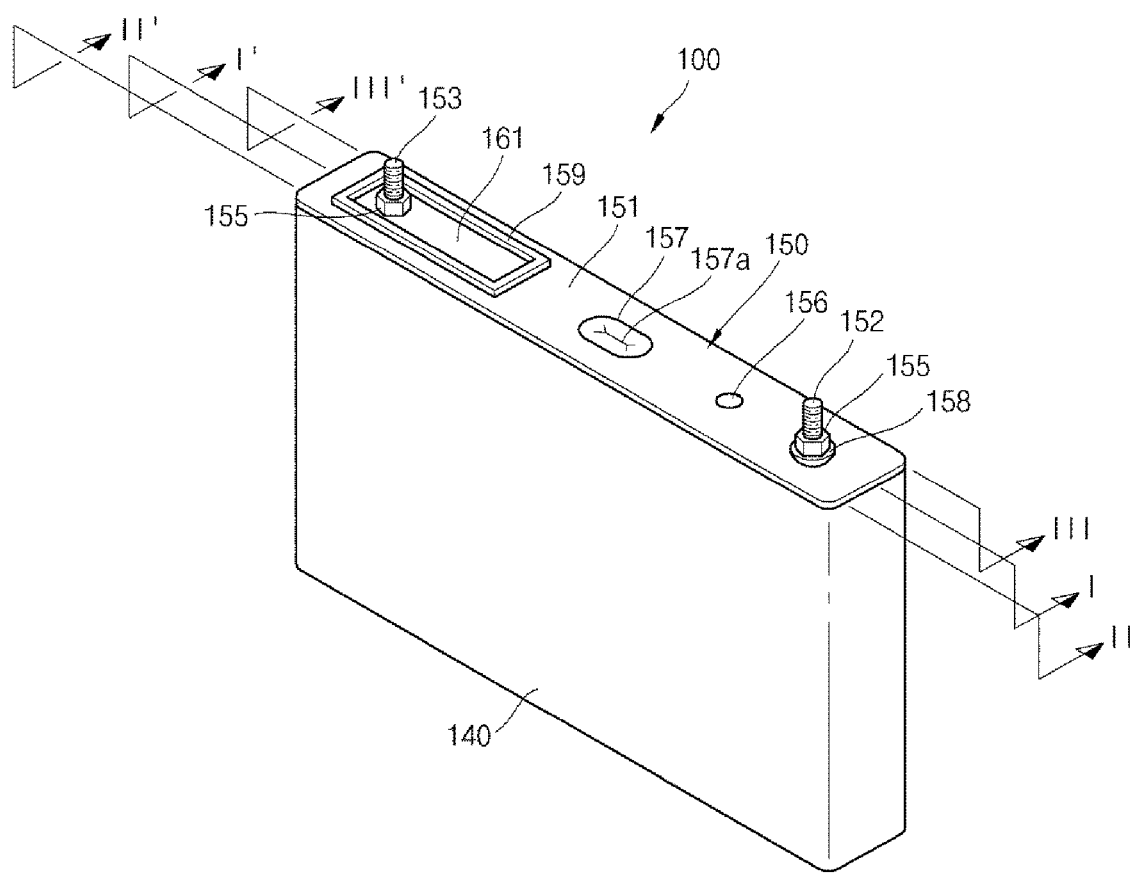
FIG. 1 is a perspective view of a secondary battery according to an aspect of the present embodiments.
Figure 2:
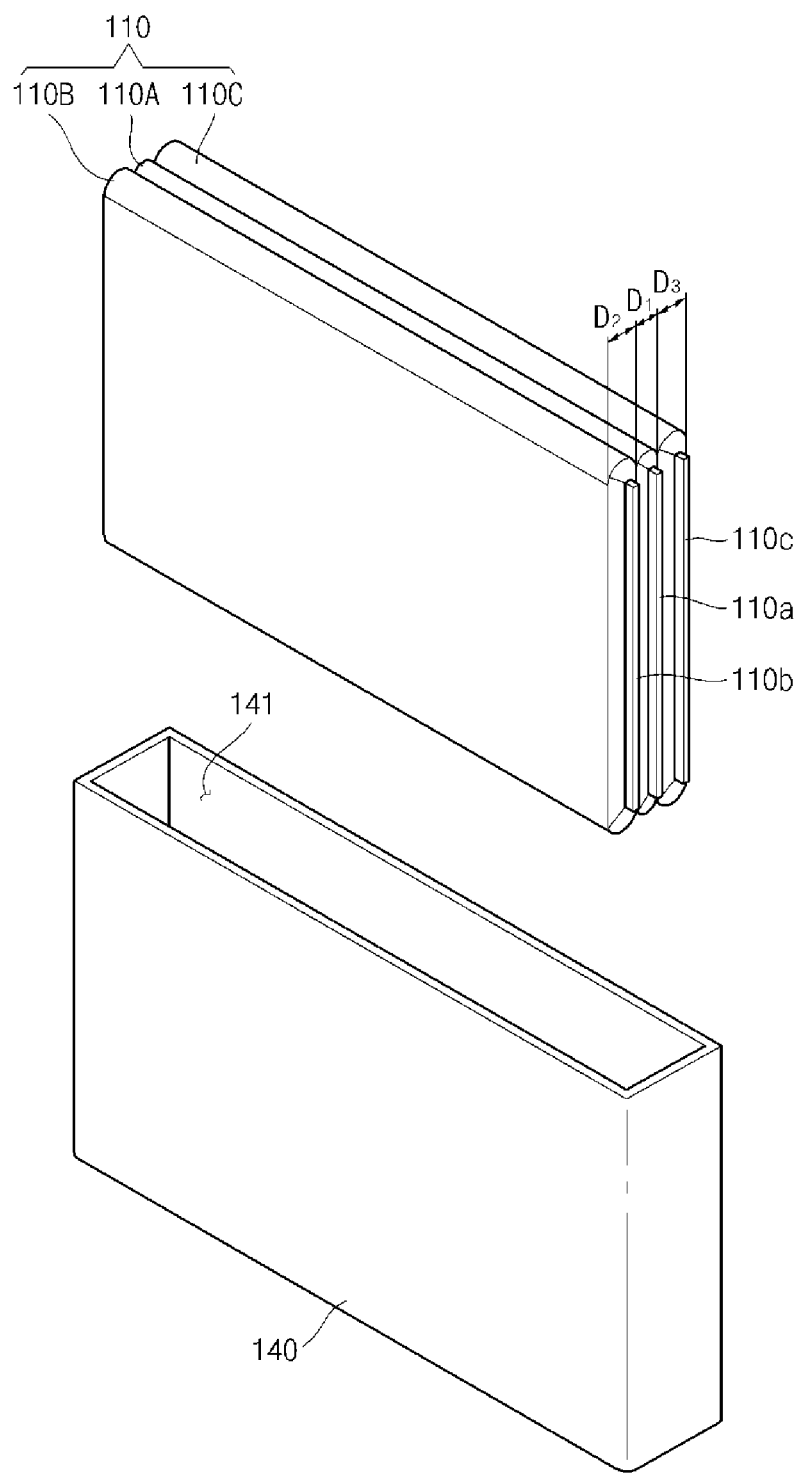
FIG. 2 is an exploded perspective view illustrating an electrode assembly and a case according to an aspect of the present embodiments.
Figure 3A:
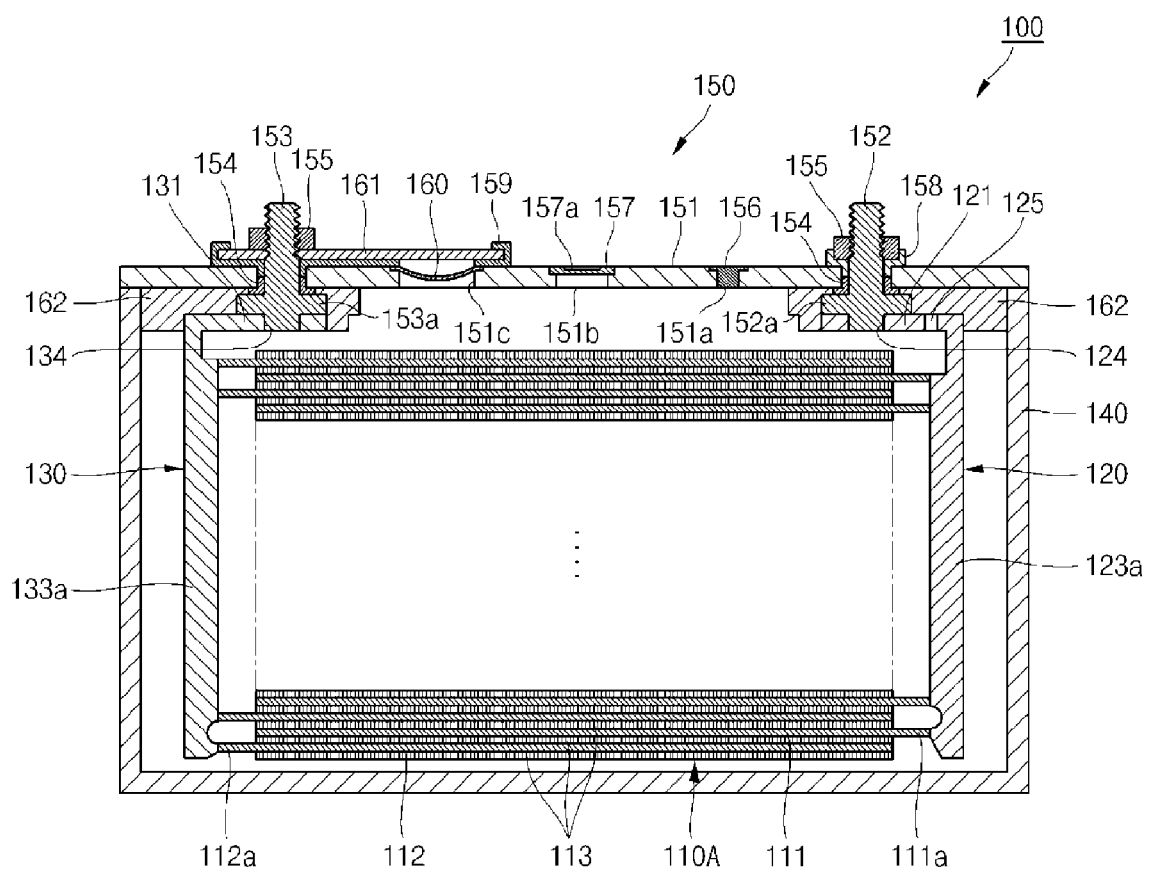
FIG. 3A is a cross-sectional view of the secondary battery taken along the line I-I' of FIG. 1.
Figure 3B:
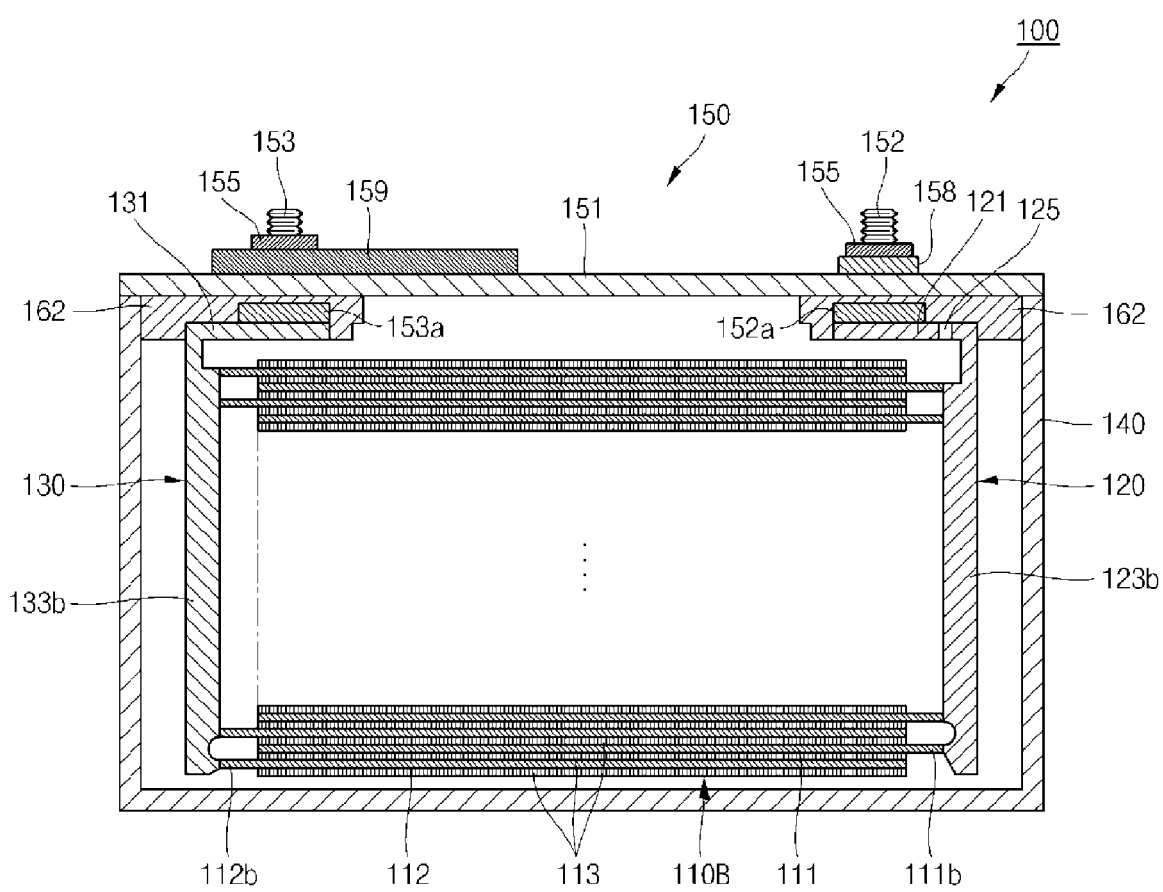
FIG. 3B is a cross-sectional view of the secondary battery taken along the line II-II' of FIG. 1
Figure 3C:
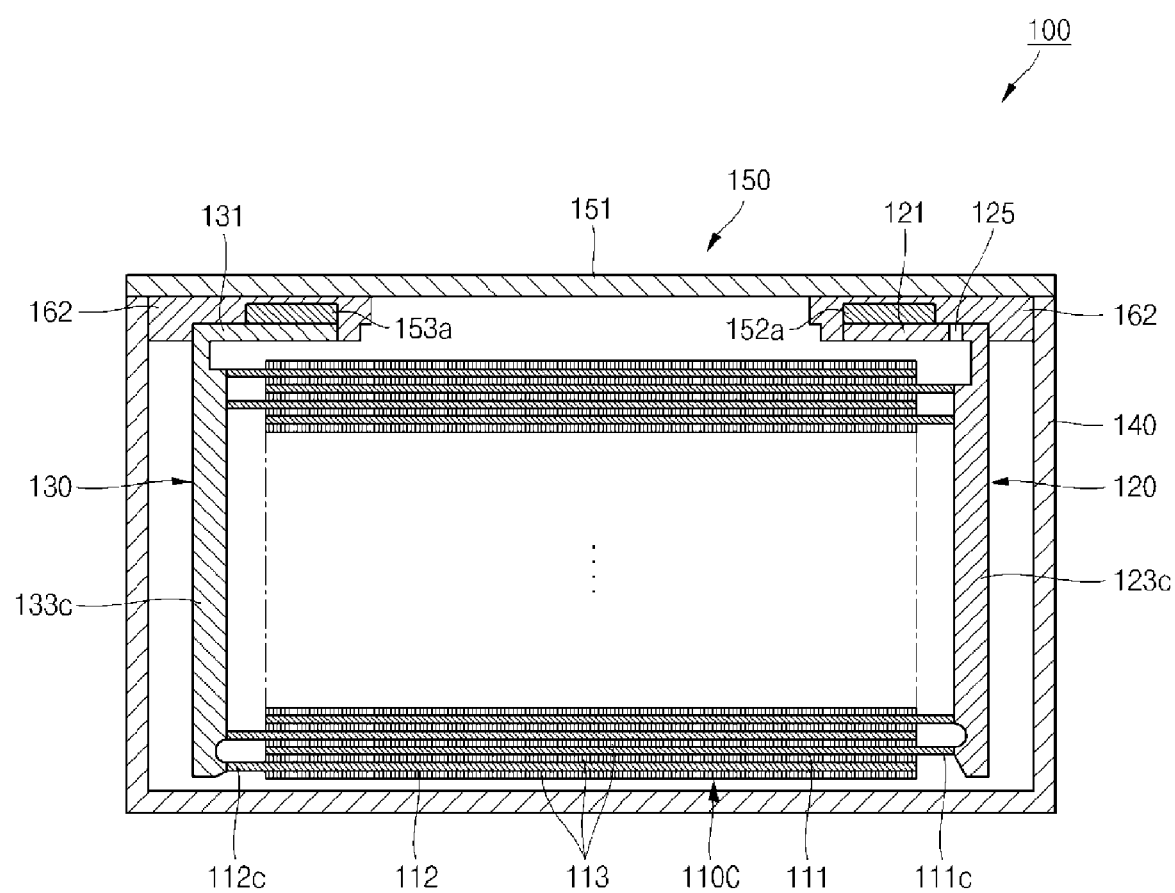
FIG. 3C is a cross-sectional view of the secondary battery taken along the line III-III' of FIG. 1.
Figure 4A:
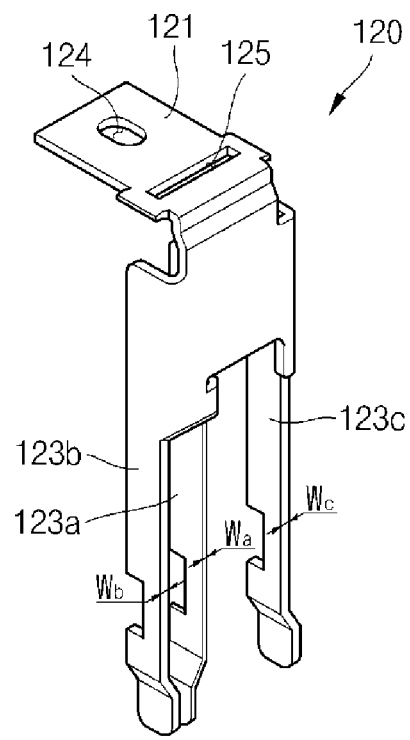
FIG. 4A is a perspective view of a first current collector according to an embodiment of the present invention and FIG. 4B is a perspective view of a second current collector according to an aspect of the present embodiments.
Figure 4B:
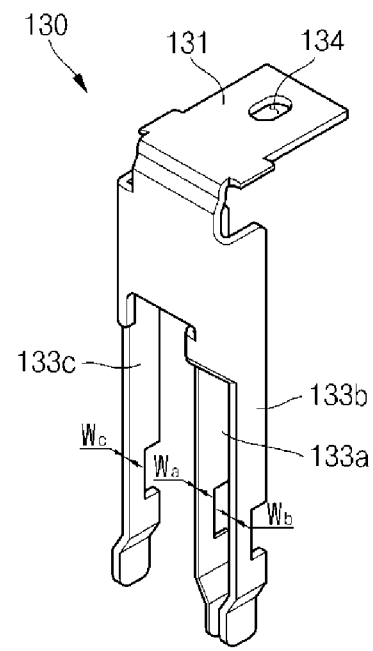

In certain embodiments, the electrode assembly 110 includes a first sub electrode assembly 110A and second sub electrode assemblies 110B and 110C as shown in FIG. 2. In certain embodiments, the first sub electrode assembly 110A may be arranged between the second sub electrode assemblies 110B and 110C to be parallel with the second sub electrode assemblies 110B and 110C. FIG. 3A is a cross-sectional view illustrating the secondary battery 100, taken along the line I-I' of FIG. 1 on the basis of the first sub electrode assembly 110A shown in FIG. 2 and FIGS. 3B and 3C are cross-sectional views illustrating the secondary battery 100, taken along the lines II-II' and III-III' on the bases of the second sub electrode assemblies 110B and 110C shown in FIG. 2 shown in FIG. 2.

In certain embodiments, the secondary battery 100 includes electrode assemblies 110A, 110B and 110C, a first current collector 120, a second current collector 130, a case 140, and a cap assembly 150.

In certain embodiments, the electrode assemblies 110A, 110B and 110C may include the first sub electrode assembly 110A and the second sub electrode assemblies 110B and 110C. In the embodiments illustrated in the figures, one first sub electrode assembly 110A and two second sub electrode assemblies 110B and 110C are shown, but the present embodiments do not limit the number of electrode assemblies to those illustrated herein. In certain embodiments, the electrode assembly may include at least centrally positioned first sub electrode assembly 110A and two or more second sub electrode assemblies 110B and 110C positioned at peripheral portions of the first sub electrode assembly 110A. In the following description, for convenience sake of explanation, the second sub electrode assemblies 110B and 110C are defined as a second-first sub electrode assembly 110B and a second-second sub electrode assembly 110C.

In certain embodiments, the first sub electrode assembly 110A may be formed by winding or stacking a stacked structure of a first electrode plate 111, a separator 113 and a second electrode plate 112, formed of a thin plate or layer. Here, the first electrode plate 111 may serve as a positive electrode and the second electrode plate 112 may serve as a negative electrode.

In certain embodiments, the first electrode plate 111 includes a first electrode active material layer formed on a first electrode current collector formed of a metal foil such as an aluminum foil and has a first electrode uncoated portion 111a corresponding to a region where the first electrode active material layer is not formed. In certain embodiments, the first electrode uncoated portion 111a may be a path of current flow between the first electrode plate 111 and the outside. However, the present embodiments do not limit the material of the first electrode plate 111 to that listed herein.

In certain embodiments, the second electrode plate 112 includes a second electrode active material layer formed on a second electrode current collector formed of a metal foil such as a nickel or copper foil and has a second electrode uncoated portion 112a corresponding to a region where the second electrode active material layer is not formed. In certain embodiments, the second electrode uncoated portion 112a may be a path of current flow between the second electrode plate 112 and the outside. However, the present embodiments do not limit the material of the second electrode plate 112 to those listed herein.

In certain embodiments, the first electrode plate 111 and the second electrode plate 112 may have reversed polarities.

In certain embodiments, the separator 113 may be positioned between the first electrode plate 111 and the second electrode plate 112 to prevent a short-circuit and allow movement of lithium ions. In certain embodiments, the separator 113 may be formed of polyethylene, polypropylene or a composite film of polyethylene and polypropylene. However, the present embodiments do not limit the material of the separator 113 to those listed therein.

In certain embodiments, the second-first sub electrode assembly 110B and the second-second sub electrode assembly 110C may have the same configuration as the first sub electrode assembly 110A. However, the second-first sub electrode assembly 110B and the second-second sub electrode assembly 110C may be formed to have a larger number of turns than the first sub electrode assembly 110A. In certain embodiments, the number of turns of the first electrode plate 111, the second electrode plate 112 and the separator 113 included in the second-first sub electrode assembly 110B and the second-second sub electrode assembly 110C may be larger than the number of turns of the first electrode plate 111, the second electrode plate 112 and the separator 113 included in the first sub electrode assembly 110A. In certain embodiments, a thickness $D_2$ of the second-first sub electrode assembly 110B and a thickness $D_3$ of the second-second sub electrode assembly may be greater than a thickness $D_1$ of the first sub electrode assembly 110A. In certain embodiments, $D_1:D_2:D_3=1:1.5:1.5$.

In a general secondary battery including a plurality of electrode assemblies, a centrally disposed electrode assembly may have lower heat transfer efficiency than side electrode assemblies. Thus, when heat is generated due to penetration or internal short circuit, a temperature of the centrally disposed electrode assembly may become higher than that of side electrode assemblies, so that there is high probability that the secondary battery undergoes thermal runaway, which may potentially result in a fire or explosion.

In contrast, in certain embodiments of the electrode assembly 110, the number of turns of the centrally positioned first sub electrode assembly 110A may be made smaller than the number of turns of second-first and second-second sub electrode assemblies 110B and 110C positioned at sides, thereby reducing an increase in the temperature of the first sub electrode assembly 110A that is centrally positioned to provide relatively low heat transfer efficiency. Accordingly, when heat is generated to the secondary battery due to penetration or internal short circuit, the safety of the secondary battery can be improved in comparison to a general secondary battery including a plurality of electrode assemblies.

In certain embodiments, the respective active material layers of the first sub electrode assembly 110A and the second-first and second-second sub electrode assemblies 110B and 110C may be different from each other.

In certain embodiments, for example as shown in FIGS. 3A-3C, opposite side ends of the first, second-first and second-second sub electrode assemblies 110A, 110B and 110C may be coupled to the first current collector 120 to be electrically connected to the first electrode plate 111 and to the second current collector 130 to be electrically connected to the second electrode plate 112, respectively.

In certain embodiments, the first current collector 120 may be made of a conductive material such as aluminum or an aluminum alloy and may be coupled to each of first electrode uncoated portions 111a, 111b and 111c protruding to one ends of the first, second-first and second-second sub electrode assemblies 110A, 110B and 110C to then be electrically connected to the first electrode plates 111 of the first, second-first and second-second sub electrode assemblies 110A, 110B and 110C, respectively.

In certain embodiments, the first current collector 120 includes a first connection part 121 and first extension parts 123a, 123b and 123c.

In certain embodiments, the first connection part 121 may be shaped of a plate having a predetermined width and may include a first terminal hole 124 and a fuse hole 125. In certain embodiments, the first terminal hole 124 may be formed at one side of the first connection part 121 and the fuse hole 125 may be formed at the other side of the first connection part 121. In certain embodiments, the fuse hole 125 may be formed in the one side of the first connection part 121, and shaped of a rectangle having a smaller width than the connecting width of the first connection part 121. In certain embodiments, the one side of the first connection part 121 may have a smaller sectional area than the other side of first connection part 121 at other than region where the first terminal hole 124 is formed.

In certain embodiments, the first extension parts 123a, 123b and 123c may be bent at the other end of the first connection part 121 and extend from the other end into multiple branches. In certain embodiments, the first extension parts 123a, 123b and 123c may be bent to be parallel with the first electrode uncoated portions 111a, 111b and 111c of the electrode assemblies 110A, 110B and 110C, respectively. In the following description, for convenience sake of explanation, the first extension parts 123a, 123b and 123c are defined as a first-first extension part 123a, a first-second extension part 123b and a first-third extension part 123c. In certain embodiments, the first-first extension part 123a may be coupled to the first electrode uncoated portion 111a of the first sub electrode assembly 110A, the first-second extension part 123b may be coupled to the first electrode uncoated portion 111b of the second-first sub electrode assembly 110B, and the first-third extension part 123c may be coupled to the first electrode uncoated portion 111c of the second-second sub electrode assembly 110C. In certain embodiments, the first-first extension part 123a, the first-second extension part 123b and the first-third extension part 123c are welded to the first electrode uncoated portions 111a, 111b and 111c by resistance welding, thereby coupling and electrically connecting each other.

In certain embodiments, the number of turns of the first sub electrode assembly 110A may be smaller than the number of turns of the second-first and second-second sub electrode assemblies 110B and 110C, thereby making the first electrode uncoated portion 111a of the first sub electrode assembly 110A thinner than the first electrode uncoated portions 111b and 111c of the second-first and second-second sub electrode assemblies 110B and 110C. With this configuration, a width Wa of the first-first extension part 123a may be made to be smaller than widths Wb and Wc of the first-second and first-third extension parts 123b and 123c. For example, in certain embodiments the first-first extension part 123a may have a width Wa of 1 mm and the first-second extension part 123b and the first-third extension part 123c may have widths Wb and Wc of 1.5 mm. In certain embodiments, the width Wa is 1.0 mm. In certain embodiments, the width Wb is 1.5 mm. In certain embodiments, the width Wc is 1.5 mm. In certain embodiments, an amount of current output from the first sub electrode assembly 110A may be different from amounts of current output from the second-first and second-second sub electrode assemblies 110B and 110C where the number of turns of the first sub electrode assembly 110A is smaller than the number of turns of the second-first and second-second sub electrode assemblies 110B and 110C. In certain embodiments, the width Wa of the first-first extension part 123a connected to the first sub electrode assembly 110A having a smaller number of turns is made to be smaller than the widths Wb and Wc of the first-second and first-third extension parts 123b and 123c connected to the second-first and second-second sub electrode assemblies 110B and 110C having a larger number of turns, as described above, in order to avoid a difference in the current amount between electrode assemblies having different numbers of turns.

In certain embodiments, the second current collector 130 may be made of a conductive material such as copper, a copper alloy, nickel or a nickel ally and is coupled to each of second electrode uncoated portions 112a, 112b and 112c protruding to the other end of each of the first, second-first and second-second sub electrode assemblies 110A, 110B and 110C, thereby electrically connecting to the second electrode plate 112 of each of the first, second-first and second-second sub electrode assemblies 110A, 110B and 110C.

In certain embodiments, the second current collector 130 includes a second connection part 131 and second extension parts 133a, 133b and 133c.

In certain embodiments, the second connection part 131 may be shaped of a plate having a predetermined width and may include a second terminal hole 134. In certain embodiments, the second terminal hole 134 may be formed at one side of the second connection part 131.

In certain embodiments, the second extension parts 133a, 133b and 133c may be bent at the other end of the second connection part 131 and may extend from the other end into multiple branches. In certain embodiments, the second extension parts 133a, 133b and 133c may be bent to be parallel with the second electrode uncoated portions 112a, 112b and 112c of the electrode assemblies 110A, 110B and 110C, respectively. In the following description, for convenience sake of explanation, the second extension parts 133a, 133b and 133c are defined as a second-first extension parts 133a, a second-second extension part 133b and a second-third extension part 133c. In certain embodiments, the second-first extension part 133a may be coupled to the second electrode uncoated portion 112a of the first sub electrode assembly 110A, the second-second extension part 133b may be coupled to the second electrode uncoated portion 112b of the second-first sub electrode assembly 110B, and the second-third extension part 133c may be coupled to the second electrode uncoated portion 112c of the second-second sub electrode assembly 110C. In certain embodiments, the second-first extension part 133a, the second-second extension part 133b and the second-third extension part 133c may be welded to one planes of the second electrode uncoated portions 112a, 112b and 112c by resistance welding, thereby coupling and electrically connecting each other.

In certain embodiments, the number of turns of the first sub electrode assembly 110A may be smaller than the number of turns of the second-first and second-second sub electrode assemblies 110B and 110C thereby making the second electrode uncoated portion 112a of the first sub electrode assembly 110A thinner than the second electrode uncoated portions 112b and 112c of the second-first and second-second sub electrode assemblies 110B and 110C. With this configuration, a width Wa of the second-first extension part 133a may be made to be smaller than widths Wb and Wc of the second-second and second-third extension parts 133b and 133c. For example, in certain embodiments, the second-first extension part 133a may be formed to a width Wa of 1 mm and the second-second and second-third extension parts 133b and 133c may be formed to widths Wb and Wc of 1.5 mm.

In certain embodiments, the case 140 may be made of a conductive metal such as aluminum, an aluminum alloy or nickel plated steel and is roughly shaped of a hexahedron having a case opening 141 in which the electrode assembly 110, the first current collector 120 and the second current collector 130 may be inserted and placed. In certain embodiments, the case opening 141 may be a substantially opened portion of the periphery of the cap assembly 150. In certain embodiments, the interior surface of the case 140 may be insulated, thereby being insulated from the electrode assembly 110, the first current collector 120, the second current collector 130 and the cap assembly 150. In certain embodiments, the case 140 may have a polarity. In certain embodiments, the case 140 may function as a positive electrode.

In certain embodiments, the cap assembly 150 may be coupled to the case 140. In certain embodiments, the cap assembly 150 may include a cap plate 151, a first electrode terminal 152, a second electrode terminal 153, a gasket 154, and nuts 155. In certain embodiments, the cap assembly 150 may further include a plug 156, a vent plate 157, a connection plate 158, an upper insulation member 159, a first short-circuit plate 160, a second short-circuit plate 161 and a lower insulation member 162.

In certain embodiments, the cap plate 151 may seal the case opening 141 and may be made of the same material as that of the case 140. In certain embodiments, the cap plate 151 may have the same polarity as that of the case 140.

In certain embodiments, the first electrode terminal 152 penetrates one side of the cap plate 151 to then be electrically connected to the first current collector 120. In certain embodiments, the first electrode terminal 152 may be shaped of a pillar. In certain embodiments, a screw thread may be formed along the peripheral edge of an upper portion of the pillar exposed to a top portion of the cap plate 151 and a flange 152a may be formed at a lower portion of the pillar positioned at a bottom portion of the cap plate 151 to prevent the first electrode terminal 152 from being dislodged from the cap plate 151. In certain embodiments, the first electrode terminal 152, a portion of the pillar positioned below the flange 152a may be fitted into the first terminal hole 124 of the first current collector 120. In certain embodiments, the first electrode terminal 152 may be electrically connected to the cap plate 151.

In certain embodiments, the second electrode terminal 153 penetrates the other side of the cap plate 151 to then be electrically connected to the cap plate 151. In certain embodiments, the second electrode terminal 153 may be shaped of a pillar. In certain embodiments, a screw thread may be formed along the peripheral edge of an upper portion of the pillar exposed to a top portion of the cap plate 151 and a flange 153a may be formed at a lower portion of the pillar positioned at a bottom portion of the cap plate 151 to prevent the second electrode terminal 153 from being dislodged from the cap plate 151. In certain embodiments, the second electrode terminal 153, a portion of the pillar positioned below the flange 153a may be fitted into the first terminal hole 134 of the second current collector 130. In certain embodiments, the second electrode terminal 153 may be insulated from the cap plate 151.

In certain embodiments, the gasket 154 may be made of an insulating material and is formed between each of the first electrode terminal 152 and the second electrode terminal 153 and the cap plate 151 to seal portions between each of the first electrode terminal 152 and the second electrode terminal 153 and the cap plate 151. In certain embodiments, the gasket 154 may prevent external moisture from being permeating into the secondary battery 100 or internal electrolyte in the secondary battery 100 from flowing out.

In certain embodiments, the nuts 155 may be engaged with the screw threads formed along the first electrode terminal 152 and the second electrode terminal 153, thereby fixing the first electrode terminal 152 and the second electrode terminal 153 to the cap plate 151.

In certain embodiments, the plug 156 may seal an electrolyte injection hole 151a of the cap plate 151, and the vent plate 157 may be installed in a vent hole 151b of the cap plate 151 and has a notch 157a formed to be opened at a predetermined pressure.

In certain embodiments, the connection plate 158 may be formed to allow the first electrode terminal 152 to be inserted into a portion between the first electrode terminal 152 and the cap plate 151 and may be tightly coupled to the cap plate 151 and the gasket 154 through the nuts 155. In certain embodiments, the connection plate 158 electrically connects the first electrode terminal 152 to the cap plate 151.

In certain embodiments, the upper insulation member 159 may be disposed between the second electrode terminal 153 and the cap plate 151 to allow the second electrode terminal 153 to be inserted thereto. In certain embodiments, the upper insulation member 159 may be tightly coupled to the cap plate 151 and the gasket 154. In certain embodiments, the upper insulation member 159 insulates the second electrode terminal 153 from the cap plate 151.

In certain embodiments, the first short-circuit plate 160 may be disposed in the short-circuit hole 151c of the cap plate 151 between the upper insulation member 159 and the cap plate 151. In certain embodiments, the first short-circuit plate 160 may include an inversion plate having a downwardly convex round part and an edge part fixed to the cap plate 151. In certain embodiments, the first short-circuit plate 160 may be inverted to upwardly protrude when an internal pressure of the secondary battery 100 exceeds a predetermined pressure due to over-charge. In certain embodiments, the first short-circuit plate 160 may have the same polarity as that of the cap plate 151.

In certain embodiments, the second short-circuit plate 161 may be disposed at an exterior side spaced apart from the cap plate 151. For example, the second short-circuit plate 161 may be above the upper insulation member 159. In certain embodiments, the second short-circuit plate 161 may be formed to allow the second electrode terminal 153 to be inserted thereto and extends to cover the short-circuit hole 151c. In certain embodiments, the second short-circuit plate 161 may be electrically connected to the second electrode terminal 153. When the internal pressure of the secondary battery 100 exceeds the predetermined pressure due to over-charge the second short-circuit plate 161 can make a contact with the first short-circuit plate 160 upwardly protruding, thereby inducing a short circuit. If the short circuit is induced, a large amount of current may flow, generating heating. Here, the other side of the first current collector 120 having the fuse hole 125 may function as a fuse.

In certain embodiments, the lower insulation member 162 may be formed between each of the first current collector 120 and the second current collector 130 and the cap plate 151, thereby preventing unnecessary short circuit.

Hereinafter, an electrode active material layer of each of the first sub electrode assembly 110A and the second-first and second-second electrode assemblies 110B and 110C will be described.

In certain embodiments, the first sub electrode assembly 110A may include an active material generating a smaller amount of heat than the second-first and second-second electrode assemblies 110B and 110C. In certain embodiments, the active material may mean an active material of the first electrode active material layer coated on each first electrode plate 111 of the first sub electrode assembly 110A, the second-first and second-second electrode assemblies 110B and 110C. For example, in certain embodiments, the first electrode active material layer of the first sub electrode assembly 110A may include $Li_xFePO_4$ ($0 \leq x \leq 1$), and the first electrode active material layer of each of the second-first and second-second electrode assemblies 110B and 110C may include $Li_xCoO_2$ ($0 \leq x \leq 1$).

Figure 5:
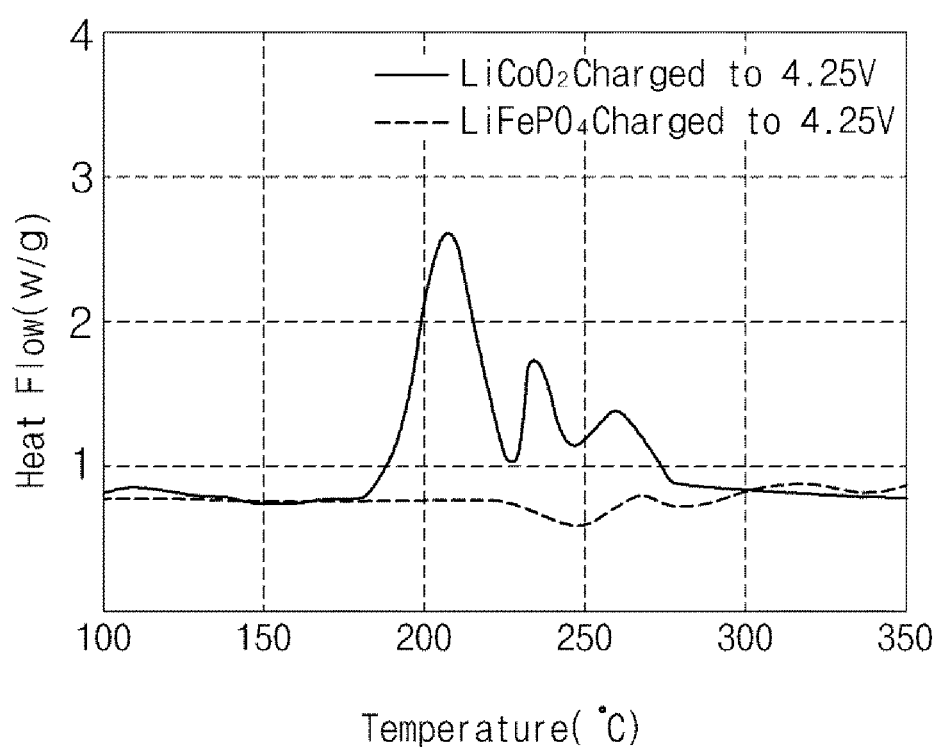
FIG. 5 is a graph for comparing heat generation characteristics of active materials of a first sub electrode assembly and second electrode assemblies.

FIG. 5 is a graph for comparing heat generation characteristics of active materials of the first sub electrode assembly 110A and the second-first and second-second electrode assemblies 110B and 110C.

Referring to FIG. 5, $Li_xFePO_4$ included in first electrode active material layer of the first sub electrode assembly 110A causes little structural change due to a charge and heat applied in a charged state. Therefore, when heat is generated in the secondary battery due to penetration or internal short circuit, an increase in the temperature of the centrally disposed first sub electrode assembly 110A can be reduced, thereby improving the safety of the secondary battery.

In certain embodiments, the centrally positioned electrode assembly may be formed to have a smaller number of turns than the side electrode assemblies and may be made of an active material generating a smaller amount of heat than that of the side electrode assemblies. Therefore, an increase in the temperature of the centrally disposed electrode assembly having relatively low transfer efficiency can be reduced, thereby improving the safety of the secondary battery when heat is generated in the secondary battery due to penetration or internal short circuit.

While the present embodiments have been described in connection with what is presently considered to be practical exemplary embodiments, it is to be understood that the invention is not limited to the disclosed embodiments and is intended to cover various modifications and equivalent arrangements included within the spirit and scope of the appended claims. Therefore, the aforementioned embodiments should be understood to be exemplary but not limiting this disclosure in any way.

What is claimed is:

1. A secondary battery comprising:
a plurality of sub electrode assemblies each formed by winding together a first electrode plate and a second electrode plate each coated with an active material layer;
a current collector; and
a case accommodating the electrode assemblies and current collector,
wherein each sub electrode assemblies comprises:
at least one or more first sub electrode assemblies; and
a plurality of second sub electrode assemblies,
wherein the first sub electrode assemblies are disposed between the second sub electrode assemblies, and
wherein the first sub electrode assemblies are wound with a smaller number of turns than the second sub electrode assemblies.

2. The secondary battery of claim 1, wherein the active material layers of the first sub electrode assemblies include $Li_xFePO_4$ ($0 < x \leq 1$).

3. The secondary battery of claim 1, wherein the active material layers of the second sub electrode assemblies include $Li_xCoO_2$ ($0 < x \leq 1$).

4. The secondary battery of claim 1, further comprising an electrode terminal electrically connected to the current collector, wherein the current collector comprises:
a connection part electrically connected to the electrode terminal; and
an extension part extending from the connection part to at least three branch parts and coupled to each of the first sub electrode assemblies and the second sub electrode assemblies.

5. The secondary battery of claim 4, wherein a thickness of a portion of the extension part coupled to the first sub electrode assemblies is smaller than a thickness of a portion of the extension part coupled to the second sub electrode assemblies.

6. The secondary battery of claim 4, wherein the thickness of the extension part coupled to the first sub electrode assemblies is 1 mm and the thickness of the extension part coupled to the second sub electrode assemblies is 1.5 mm.

7. The secondary battery of claim 1, further comprising a separator disposed between the first and second electrode plates.

8. The secondary battery of claim 1, wherein the current collector is electrically connected to the sub electrode assemblies, respectively.

9. The secondary battery of claim 2, wherein x is 1.

10. The secondary battery of claim 3, wherein x is 1.

11. An electrode assembly of a secondary battery comprising a plurality of sub electrode assemblies formed by winding together a first electrode plate and a second electrode plate, each coated with an active material layer and a separator, respectively, the electrode assembly comprising:
   at least one or more first sub electrode assemblies; and
   a plurality of second sub electrode assemblies,
   wherein the first sub electrode assemblies are disposed between the second sub electrode assemblies, and
   wherein the first sub electrode assemblies are wound with a smaller number of turns than the second sub electrode assemblies.

12. The electrode assembly of claim 11, wherein the active material layers of the first sub electrode assemblies include $Li_xFePO_4$ (0<x≤1).

13. The electrode assembly of claim 11, wherein the active material layers of the second sub electrode assemblies include $Li_xCoO_2$ (0<x≤1).

14. The electrode assembly of claim 11, further comprising a separator disposed between the first and second electrode plates.

15. The secondary battery of claim 12, wherein x is 1.

16. The secondary battery of claim 13, wherein x is 1.

* * * * *